United States Patent
Vyas et al.

(10) Patent No.: US 8,583,812 B2
(45) Date of Patent: Nov. 12, 2013

(54) REDUCING THE SIZE OF VOLATILE MEMORY IN AN END DEVICE DESIGNED TO OPERATE WITH MULTIPLE VERSIONS OF INTERNET PROTOCOL

(75) Inventors: Pankaj Vyas, Bangalore (IN); Sibasis Purohit, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 37 days.

(21) Appl. No.: 13/365,266

(22) Filed: Feb. 3, 2012

(65) Prior Publication Data

US 2013/0205003 A1    Aug. 8, 2013

(51) Int. Cl.
*G06F 15/16*    (2006.01)

(52) U.S. Cl.
USPC ........... 709/230; 709/203; 709/217; 709/224; 709/238

(58) Field of Classification Search
USPC .......................... 709/203, 217, 224, 226, 238
See application file for complete search history.

(56) References Cited

U.S. PATENT DOCUMENTS

| | | | | |
|---|---|---|---|---|
| 6,466,985 | B1 * | 10/2002 | Goyal et al. | 709/238 |
| 7,535,926 | B1 * | 5/2009 | Deshpande et al. | 370/469 |
| 7,590,736 | B2 * | 9/2009 | Hydrie et al. | 709/226 |
| 7,734,818 | B2 * | 6/2010 | Hernandez et al. | 709/245 |
| 7,924,832 | B2 * | 4/2011 | Li et al. | 370/389 |
| 7,929,533 | B2 * | 4/2011 | King et al. | 370/392 |
| 7,953,076 | B2 | 5/2011 | Kim et al. | |
| 7,957,399 | B2 * | 6/2011 | Nice et al. | 370/395.5 |
| 7,974,217 | B2 | 7/2011 | Park et al. | |
| 8,054,839 | B2 * | 11/2011 | Cha et al. | 370/395.5 |
| 2001/0040895 | A1 | 11/2001 | Templin | |
| 2005/0182829 | A1 * | 8/2005 | King et al. | 709/220 |
| 2007/0011294 | A1 * | 1/2007 | Ohara | 709/223 |

OTHER PUBLICATIONS

"Jivika Govil, Jivesh Govil, Navkeerat Kaur, Harkeerat Kaur" An Examination of IPv4 and IPv6 Networks: Constraints and Various Transition Mechanisms "http://home.ifi.uio.no/paalee/referencing_publications/ref-v6trans-govil-southeastcon-2008.pdf" Copyright 2008 IEEE, pp. 178-185.

"I-Ping Hsieh, Shangjuh Kao" Managing the Coexisting Network of IPv6 and IPv4 under Various Transition Mechanisms "http://csis.pace.edu/~ctappert/dps/d861-06/pres-ipv6-1.pdf" Copyright 2005 IEEE, pp. 1-7.

"Network Working Group" Internet Control Message Protocol (ICMPv6) for the Internet Protocol Version 6 (IPv6) Specification, "http://tools.ietf.org/html/rfc4443" Copyright: The Internet Society (2006) pp. 1-25.

"Network Working Group" Neighbor Discovery for IP version 6 (IPv6), "http://tools.ietf.org/html/rfc4861", Sep. 2007 pp. 1-98.

* cited by examiner

*Primary Examiner* — Phuoc Nguyen

(74) *Attorney, Agent, or Firm* — Narendra Reddy Thappeta

(57) ABSTRACT

An end device in a network is designed to operate consistent with multiple versions of the internet protocol. The end device determines which version of the internet protocol, according to which the network is operative, by monitoring a set of packets on the network. Based on the determination of the version of internet protocol, the end device loads in an internal volatile memory only those instructions and data required for operation according to the determined version. Instructions and data required for operation according to other version(s) are not loaded into the volatile memory. Size requirements of the volatile memory are thereby reduced.

3 Claims, 5 Drawing Sheets

| Applications 410 | | |
|---|---|---|
| TCP 420 | UDP 440 | |
| IPv6 430 | IPv4 450 | |
| Device Driver 460 | | |
| Hardware 470 | | |

*FIG. 4*

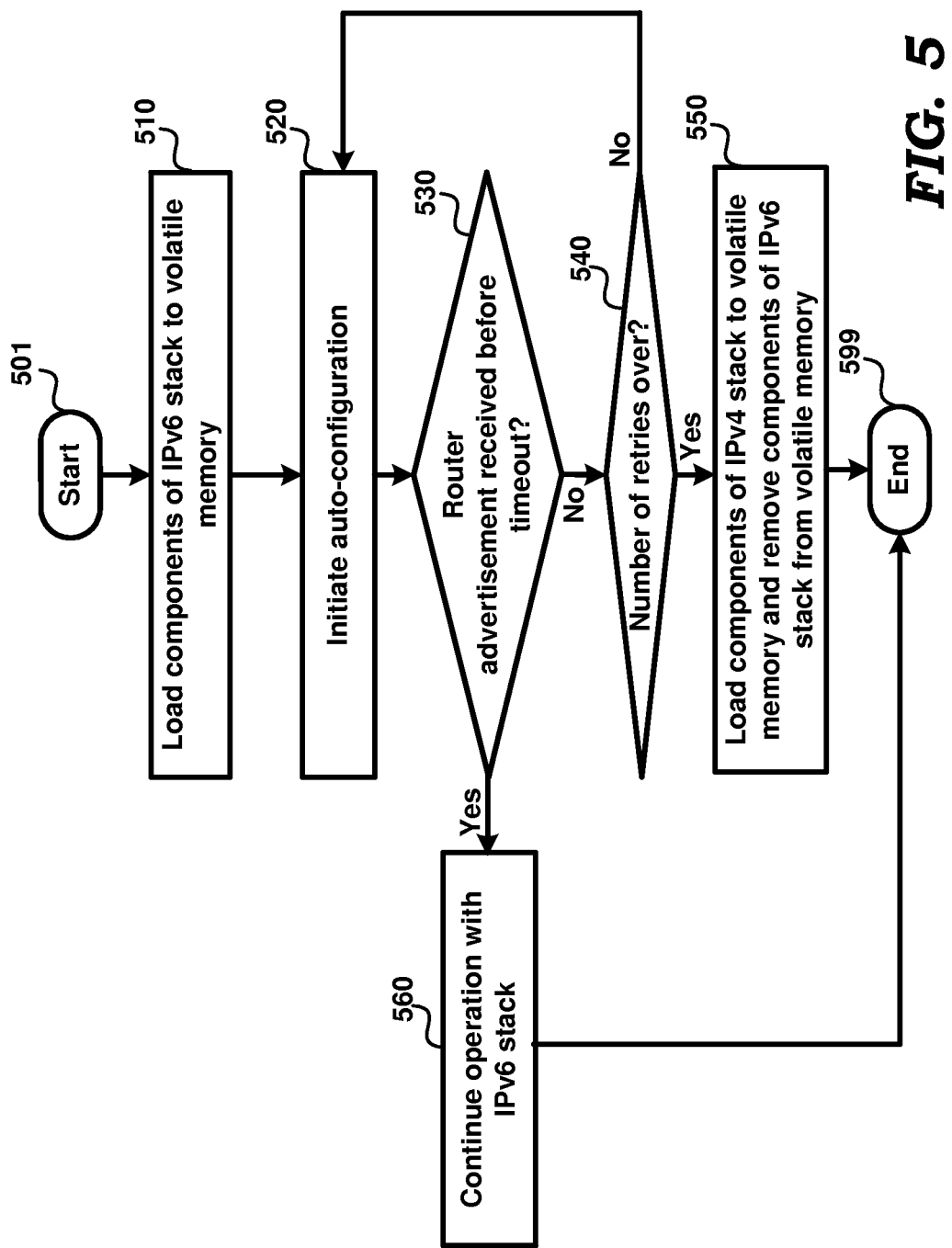

REDUCING THE SIZE OF VOLATILE MEMORY IN AN END DEVICE DESIGNED TO OPERATE WITH MULTIPLE VERSIONS OF INTERNET PROTOCOL

BACKGROUND OF THE INVENTION

1. Technical Field

Embodiments of the present disclosure relate generally to end device in networks, and more specifically to techniques for reducing volatile memory requirement in an end device designed to operate with multiple versions of internet protocol.

2. Related Art

As is well known in the relevant arts, Internet Protocol (IP) is a communications protocol used for transmission and reception of data in the form of packets between devices connected by networks. According to IP, each data packet contains a header and a payload portion. The payload portion contains the actual data to be transmitted, while the header contains information for delivery of the packet from a source system to a destination system. The header includes a sender address and a destination address. Delivery of a data packet according to IP is based on the destination address. Typically, routers along a network path between a sender node and a destination node store routing tables. On receipt of an IP packet, a router may examine the destination address, look-up a routing table stored in memory and forward the packet on a corresponding path indicated by the routing table. Devices that are the source and destinations of packets are termed end devices, and are identified by their respective IP addresses. Thus, the header of an IP packet includes the IP address of the source/sender end device as well the IP address of the destination end device.

Multiple versions of IP may concurrently be in use. For example, currently networks designed according to internet protocol version 4 (IPv4) coexist with networks designed according to internet protocol version 6 (IPv6). Consequently, end devices may be designed such that they can operate with multiple versions of internet protocol (IPv6 and IPv4 in the above example).

The requirement to operate with multiple IP versions may present some challenges at least in some environments. For example, IPv4 uses 32-bit addressing to specify source and destination addresses, while IPv6 uses 128-bit addressing to specify source and destination addresses. In addition other differences, such as buffer management, protocols with higher layers such as transport layer, may also exist. In some prior end devices, to accommodate both IPv6 and IPv4 capabilities, both IPv6 and IPv4 components (instructions and/or data components that enable communication consistent with IPv6 and IPv4 protocols respectively) are copied from a non-volatile memory to a volatile memory for execution (of the corresponding component—IPv6 or IPv4). Due to such use of the volatile memory, a volatile memory of a correspondingly large size may be required.

As is well-known volatile memory refers to memory that requires sustained power application to retain stored data, static random access memory (SRAM) being an example. It may be desirable to reduce the size of volatile memory used in end devices designed to operate with multiple versions of internet protocol.

BRIEF DESCRIPTION OF THE VIEWS OF DRAWINGS

Example embodiments of the present invention will be described with reference to the accompanying drawings briefly described below.

FIG. 4 is a diagram showing example hardware and software components that represent an end device, in an embodiment of the present invention.

FIG. 5 is a flowchart illustrating the manner in which the size of volatile memory is reduced in end devices that are designed to operate with multiple versions of internet protocol, in another embodiment of the present invention.

The drawing in which an element first appears is indicated by the leftmost digit(s) in the corresponding reference number.

DETAILED DESCRIPTION

1. Overview

An aspect of the present invention reduces the size of volatile memory in an end device in a network, with the end device being designed to operate either with a first version of internet protocol or according to a second version of internet protocol. In an embodiment, the end device monitors a set of packets on a network to determine a version of internet protocol using which the network is operative. The end device then loads in the volatile memory only those data and instructions required for operation of the end device according to the first version of internet protocol if the monitoring determines that the version is the first version. However, if the monitoring determines that the version is the second version, the end device loads in the volatile memory only those data and instructions required for operation of the end device according to the second version.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
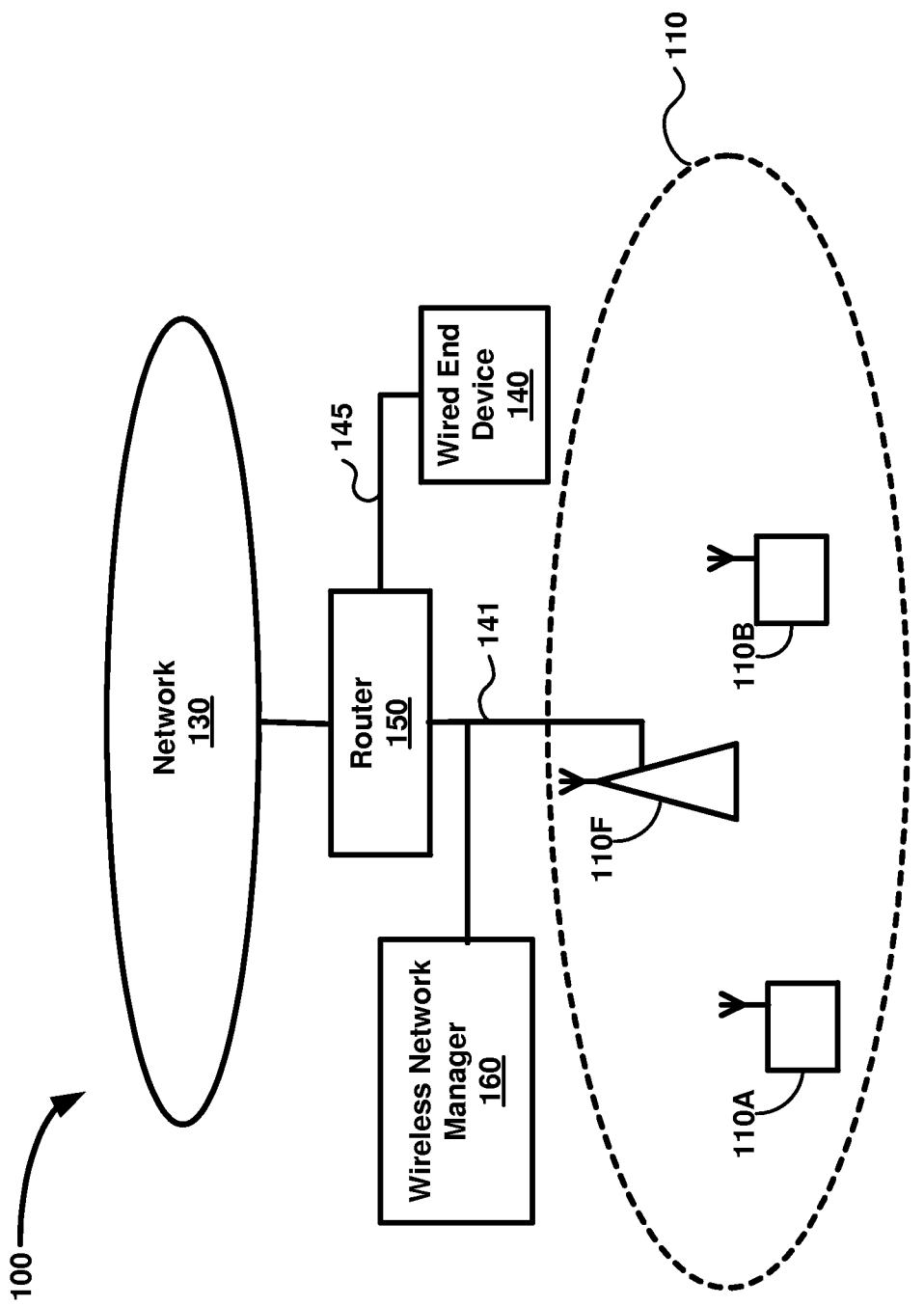
FIG. 1 is a block diagram of an example environment in which several features of the present invention can be implemented.

FIG. 1 is a block diagram illustrating an example environment in which several features of the present invention can be implemented. The example environment is shown containing only representative systems for illustration. However, real-world environments may contain many more systems/components as will be apparent to one skilled in the relevant arts by reading the disclosure provided herein.

System 100 of FIG. 1 is shown containing wireless network devices 110A, 110B and 110F, router 150, wired end device 140, network 130, and wireless network manager 160. Wireless devices 110A and 110B correspond to wireless clients, while wireless device 110F corresponds to an access point (AP). Block 110 represents a basic service set (BSS) consistent with any of the family of IEEE 802.11 standards (including as specified in IEEE 802.11a, 802.11b, 802.11g and 802.11n). Other environments may include more than one BSS, with the BSSs being interconnected to form an extended service set (ESS) consistent with IEEE 802.11 standards. AP 110F is connected by a wired medium (141) to router 150. Wireless clients 110A and 110B may communicate with each other via AP 110F, and also with wired end device 140 and end devices in network 130 via AP 110 and router 150. For simplicity only two clients 110A and 110B are shown. However, BSS 110 may contain more or fewer clients. The term "wireless station" is used herein to refer to both a wireless client as well as an access point. Additionally, devices that are either senders or recipients of data packets having a structure according to IP are termed end devices. Thus, any of devices 110A, 110B, 110F, 140 and sources and destinations of data packets in network 130 are termed 'end devices'.

Wireless network manager 160 transmits configuration and control messages to AP 110F via wired path 141. Some of the configuration and control messages may be meant for clients 110A-110B. Accordingly, AP 110F forwards the corresponding configuration and control messages meant for the clients, either as unicast messages (directed to a specific one of clients 110A-110B) or as broadcast messages. Although shown separate from AP 110F, the features of wireless network manager may instead be integrated within AP 110F in some embodiments.

Wireless network manager 160 may additionally be designed to operate as a controller of BSS 110, and issue network commands to and receive data from one or more of clients 110A-110B, and may thus operate to provide desired features such as for example, temperature and pressure monitoring, etc., based on the specific environment in which the clients 110A-110B are deployed. The data received from clients 110A-110B may represent measured values of desired parameters such as temperature, pressure, humidity, etc. In other embodiments, clients 110A-110B may be deployed for other purposes. For example, clients 110A-110B may represent embedded devices, computing device such as a laptop, etc., and may transfer data with other devices in BSS 110 or network 130 based on corresponding requirements.

Wired end device 140 may represent a computing device (e.g., laptop, PC, embedded device, sensor, etc.), and is connected to router 150 via a wired medium 145. Wired end device 140 may communicate with devices in BSS 110 and with end devices in network 130 via router 150.

Router 150 enables communication access between devices 110A, 110B, 110F, 140 and network 130. Thus, router 150 provides routable access to end points (not shown) in network 130 to data packets originating from any of devices 110A, 110B, 110F or 140, and vice versa. In addition, router 150 also enables communication between wired end device 140 and BSS 110. The communication between any set of devices (two or more) in system 100 is performed consistent with the internet protocol. Accordingly, router 150 may store routing tables internally for routing (switching) of data packets based on examination of destination addresses in headers of the data packets, according to the internet protocol.

Network 130 may represent the internet (also known as the World Wide Web), a portion of the internet or an intranet (e.g., WLAN). In general, network 130 may be designed for communication according to IPv6 or IPv4. Accordingly, each of end devices 110A, 110B, 110F and 140 may be designed to operate with either version (IPv6 or IPv4) of IP. Thus, each of each of end devices 110A, 110B, 110F and 140 contain both IPv6 and IPv4 components (instructions and/or data components that enable communication consistent with IPv6 and IPv4 protocols respectively). Typically, network 130 is a wired network. However, one or more sections/portions of network 130 may operate wirelessly. In the alternative, the entirety of network 130 may operate as a wireless network.

In a prior embodiment of end devices (such as 110A, 110B, 110F and 140), both the IPv6 and the IPV4 components are stored in a non-volatile serial memory (e.g., serial EEPROM) in the corresponding end device, and both IPv6 and IPV4 components are copied to a volatile memory (e.g., static RAM) in the corresponding end device. Then, the corresponding component (IPv6 or IPV4) is used. The disadvantage with such an approach is that both IPv6 and IPV4 being copied to the volatile memory translates to a larger memory size requirement for the volatile memory, which may not be desirable.

Embodiments of the present disclosure enable reduction in size of volatile memory required in end devices that are designed to operate with multiple versions of internet protocol, as described next with respect to a flowchart.

3. Minimizing the Size of Volatile Memory

Figure 2:
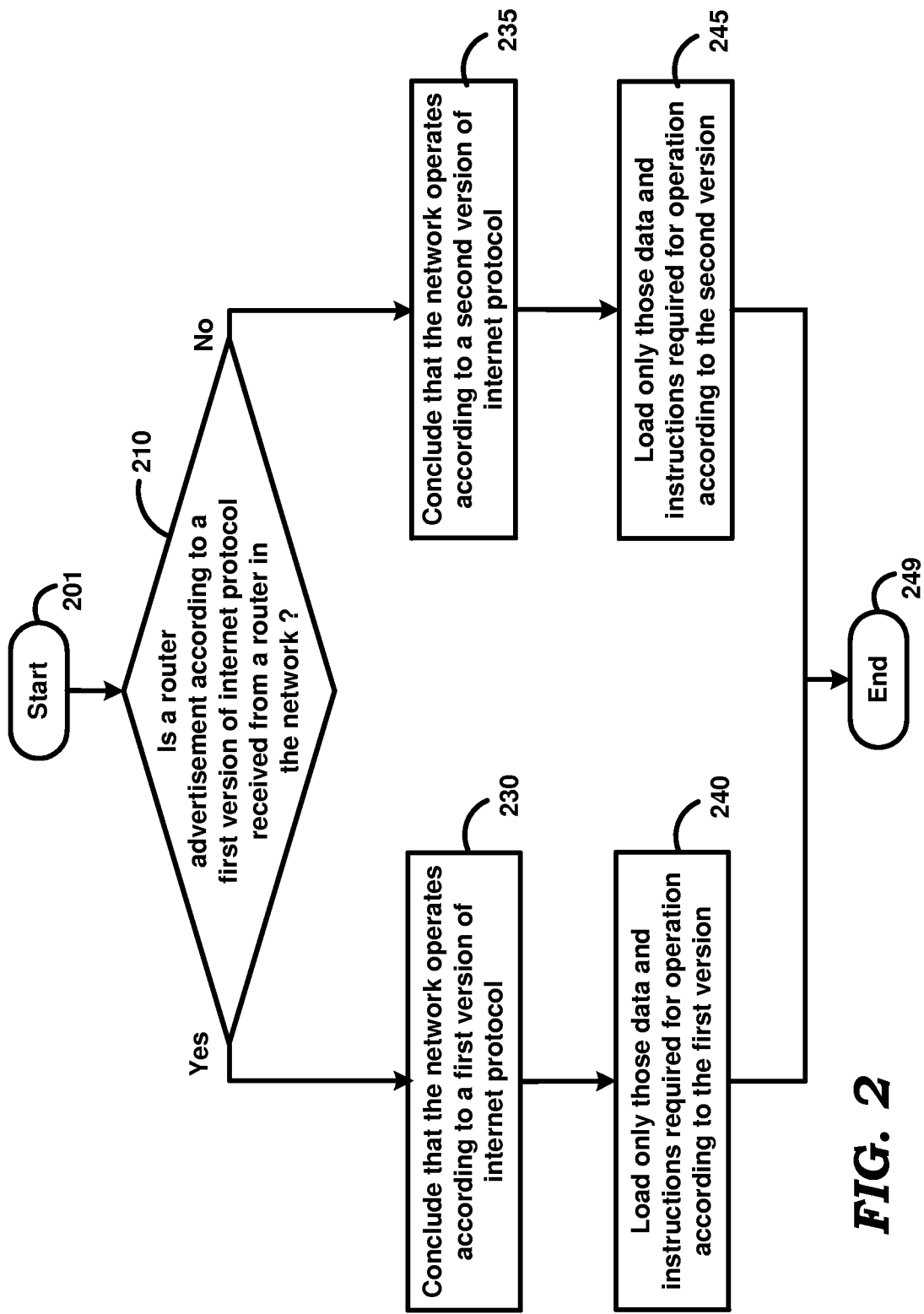
FIG. 2 is a flowchart illustrating the manner in which the size of volatile memory is reduced in end devices that are designed to operate with multiple versions of internet protocol, in an embodiment of the present invention.

FIG. 2 is a flowchart illustrating the manner in which the size of volatile memory is reduced in end devices that are designed to operate with multiple versions of internet protocol, in an embodiment. The flowchart is described with respect to the environment of FIG. 1, and in relation to end device 110A and network 130 in particular, merely for illustration. However, various features described herein can be implemented in other environments and using other components (e.g., end devices 110B, 110F or 140) operating in other networks (wired and/or wireless) as well, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, end device 110A determines if a router advertisement according to a first version of internet protocol is received from a router (e.g., router 150) in network 130. If a router advertisement according to the first version is received, control passes to step 230. However, if a router advertisement according to the first version is not received, control passes to step 235.

In step 230, end device 110A concludes that network 130 operates according to a first version of internet protocol. Control then passes to step 240.

In step 235, end device 110A concludes that network 130 operates according to a second version of internet protocol. Control then passes to step 245.

In step 240, end device 110A loads into a volatile memory in end device 110 only those data and instructions required for operation according to the first version of internet protocol. The instructions and data enable end device 110A to communicate with other end devices (including wired end device 140 and end devices in network 130) according to (or using the) the first version of internet protocol. The data and instructions required for operation according to other version(s) (e.g., second version, noted below) of internet protocol are not copied to (or created in) the volatile memory. Control then passes to step 249, in which the flowchart ends.

In step 245, end device 110A loads into a volatile memory in end device 110 only those data and instructions required for operation according to the second version of internet protocol. The instructions and data enable end device 110A to communicate with other end devices (including wired end device 140 and end devices in network 130) according to (or using the) the second version of internet protocol. The data and instructions required for operation according to other version(s) (e.g., first version, noted above) of internet protocol are not copied to (or created in) the volatile memory. Control then passes to step 249, in which the flowchart ends.

While receipt or non-receipt of a router advertisement is noted as the basis for determining the version of internet protocol in the steps of flowchart 3, in general end device 110A can monitor other types of packets on a network to determine the version of internet protocol.

In an embodiment, the first and second versions of internet protocol referred to in the flowchart above are respectively IPv6 (described in "RFC 2460—Internet Protocol, Version 6 (IPv6) Specification") and IPv4 (described in "RFC 791— Internet Protocol"). At power-on or upon start of operation, end device 110A may copy all instructions and data corresponding to IPv6 and ICMPv6 (Internet Control Message Protocol for IPv6) components to the volatile memory (from a non-volatile memory such as a serial EEPROM—electrically erasable and programmable read only memory) at power-ON/startup.

In other embodiments, end device 110A may copy only those instructions and data into the volatile memory as necessary for determining if a router advertisement according to IPv6 is received from a router (e.g., router 150) in network 130. If an IPv6 router advertisement is received, then network 130 is designed to operate according to IPv6, and end device 110A loads only IPv6-related instructions and data into volatile memory. End device 110A may then start communicating with other devices in network 130 or with end wired end device 140 using the IPv6 protocol.

On the other hand, if a router advertisement according to IPv6 is not received from a router (e.g., router 150) in network 130, end device 110A concludes that network 130 is designed to operate according to IPv4. End device 110A may wait for a pre-determined time-out interval before such a conclusion. End device 110A then loads only IPv4-related instructions and data into volatile memory (from the non-volatile memory), and may start communicating with other devices in network 130 or with end wired end device 140 using the IPv4 protocol.

In another embodiment, end device 110 broadcasts a router solicitation message (as specified in "IPv6 Stateless Address Auto-configuration in RFC 2462, and also in section 4.1 of RFC 4861) rather than just waiting to receive the router advertisement of step 210. IPv6 specifies the format of the router solicitation message. If, in response, end device 110 does not receive a router advertisement from router 150, end device 110 concludes that network 130 is designed to operate according to IPv4. In another embodiment, end device 110 may repeatedly broadcast the router solicitation message till a router advertisement is received, or till a predetermined number of broadcasts of the router solicitation message are over if no router advertisement is received.

FIG. 5 is a flowchart illustrating the manner in which the size of volatile memory is reduced in end devices that are designed to operate with multiple versions of internet protocol, in another embodiment of the present invention. The flowchart starts in step 501, in which control passes immediately to step 510.

In step 510, end device 110A, loads components of IPv6 stack (instructions and data related to ICMPv6 and IPv6) to volatile memory, at start-up/power on of end device 110A. Control then passes to step 520.

In step 520, end device 110A initiates auto-configuration according to IPv6. Accordingly, end device transmits a router solicitation message to a router 150, and starts a timer. Control then passes to step 530.

In step 530, end device checks if a router advertisement is received from router 150 before timeout of the timer (set in step 520). According to IPv6, a router receiving a router solicitation message is expected to reply with a router advertisement. If a router advertisement is received before expiry of the timer (i.e., before timeout), control passes to step 560. However, if a router advertisement is not received before timeout, control passes to step 540.

In step 540, end device 110A checks if a number of retries is over. The number of retries represents a predetermined number of times that end device 110A transmits a router solicitation message expecting at each trial a router advertisement to be received in response. If the number of retries is not over, control passes to step 520. However, if the number of retries is over, control passes to step 550.

In step 550, end device 110A loads components of IPv4 stack to volatile memory, and removes components of IPv6 stack from volatile memory. Thus, in step 550, end device 110A concludes that network 130 operates according to IPv4. Control then passes to step 599, in which the flowchart ends.

In step 560, end device 110A continues operation with IPv6 stack (which was earlier loaded to volatile memory). Thus, in step 560, end device 110A concludes that network 130 operates according to IPv6. Control then passes to step 599, in which the flowchart ends.

It may be appreciated that the approach described above enables the size of volatile memory required for proper operation of end device 110A is lesser than in the prior approaches noted above. Thus, end device 110A (and any other similar end device, such as 110B, 110F and 140) can be implemented with lower cost and lower power consumption.

A router advertisement according to IPv6 has a message structure as described in detail in section 4.2 of RFC 4861 (Router Advertisement Message Format), which is incorporated in its entirety herewith. Based on the IP header of the router advertisement, end device 110A determines the version of IP.

It may be appreciated that the format of section 4.2 of RFC 4861 is specific to IPv6, and that in other environments the structure, content and mechanism of identification of the version of internet protocol may be correspondingly different. A router solicitation message according to IPv6 has a message structure as described in detail in section 4.1 of RFC 4861 (Router Solicitation Message Format). ICMPv6 is described in RFC 4443, which is incorporated in its entirety herewith.

The implementation details of end device 110A in an embodiment are described next.

4. End Device

Figure 3:
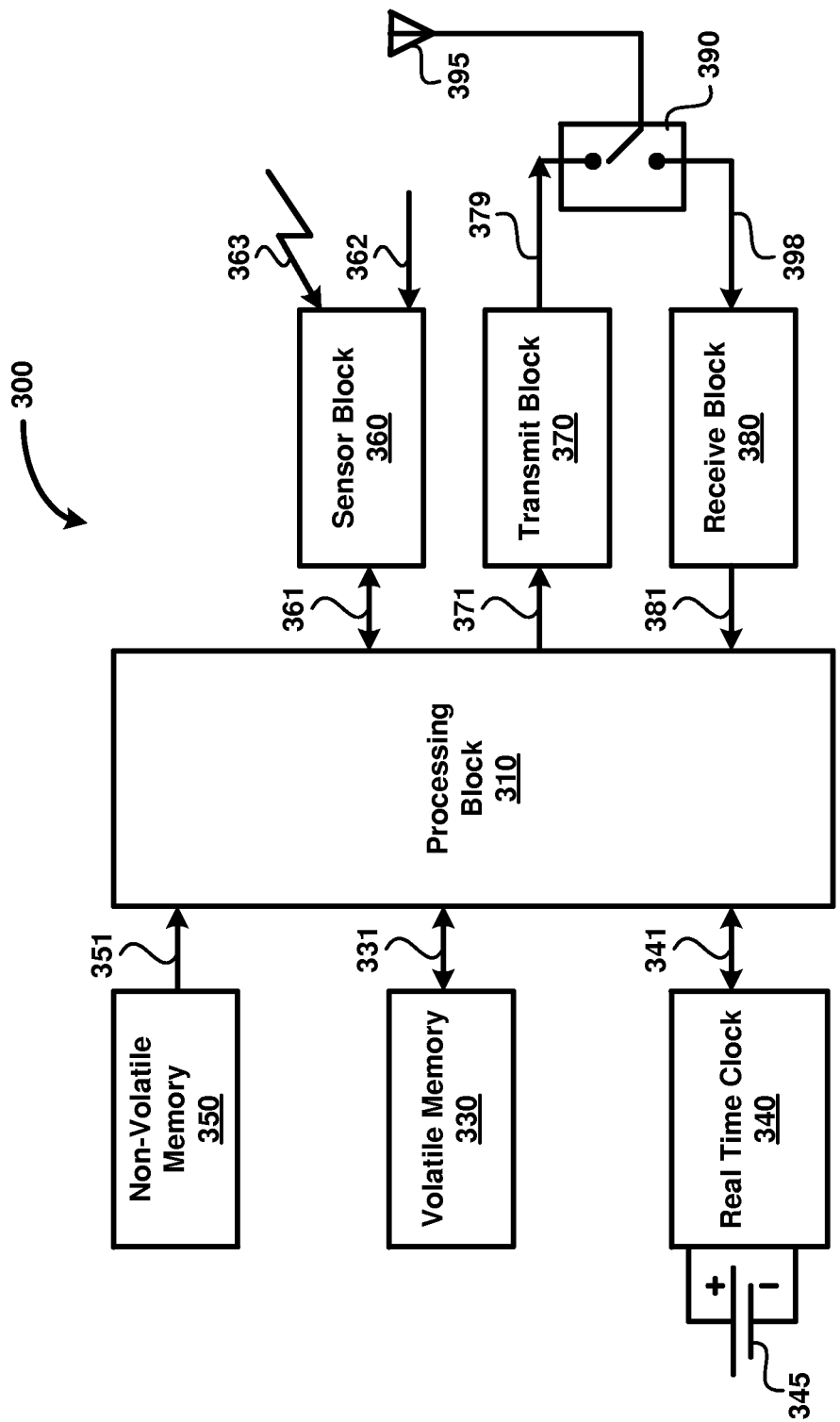
FIG. 3 is a block diagram of the implementation details of an end device in an embodiment of the present invention.

FIG. 3 is a block diagram illustrating the implementation details of an end device in an embodiment of the present invention. End device 300 may correspond to any of end devices 110A, 110B, 110F, and 140. End device 300 is shown containing processing block 310, volatile memory 330, real-time clock (RTC) 340, battery 345, non-volatile memory 350, sensor block 360, transmit block 370, receive block 380, switch 390 and antenna 395. The whole of end device 300 may be implemented as a system-on-chip (SoC), except for battery 345. Alternatively, the blocks of FIG. 3 may be implemented on separate integrated circuits (IC).

The components/blocks of sensor device 300 are shown merely by way of illustration. However, end device 300 may contain more or fewer components/blocks. Further, although not shown in FIG. 3, all blocks of end device 300 may be connected automatically to an auxiliary power source (such as battery 345) in the event of failure of main power source (not shown).

Sensor block 360 may contain one or more sensors, as well as corresponding signal conditioning circuitry, and provides on path 361 measurements/values of physical quantities such as temperature, pressure, etc., sensed via wired path 362 or wireless path 363.

Antenna 395 operates to receive from and transmit to a wireless medium corresponding wireless signals containing data. Switch 390 may be controlled by processing block 310 (connection not shown) to connect antenna 395 either to receive block 380 via path 398, or to transmit block 370 via path 379, depending on whether end device 300 is to receive or transmit.

Transmit block 370 receives data (to be transmitted via antenna 395) on path 371 from processing block 310, generates a modulated radio frequency (RF) signal according to IEEE 802.11 standards, and transmits the RF signal via switch 390 and antenna 395. Receive block 380 receives an RF signal bearing data via switch 390 and antenna 395, demodulates the RF signal, and provides the extracted data to processing block 310 on path 381.

RTC 340 operates as a clock, and provides the 'current' time to processing block 310 on path 341. RTC 340 may be backed-up by battery 345 (in addition to the normal source of power, not shown in the Figure). RTC 340 may also contain memory to store critical information received from processing block 310. Although not shown as such in FIG. 3, battery 345 may also be used as back-up power to one or more of the other components/blocks of station 300.

Non-volatile memory 350 stores instructions, which when executed by processing block 310, causes end device 300 to provide several desired features noted herein. For example, in the context of wireless sensor networks used for building or plant automation, processing block 310 may process and transmit measurement data such as temperature, pressure etc., obtained from sensor block 360. In addition, the instructions may be designed to enable wireless client to operate consistent with the description provided above with respect to client 110A. Thus, non-volatile memory 350 contains instructions and data to enable end device 110A to communicate with wired end device 140 as well as end devices in network 130 according to IPv6 and IPv4. Further, non-volatile memory 350 contains instructions to perform the steps of the flowchart of FIG. 2. In an embodiment, non-volatile memory 350 is a serial EEPROM. In other embodiments, non-volatile memory 350 may be implemented differently.

Volatile memory 330 may be used to store data and temporary variables required for processing block 310 to provide desired features. In particular, instructions and data representing the software modules and variables for enabling communication according to a version (e.g., IPv6 or IPv4) of the internet protocol may be copied by processing block 310 from non-volatile memory 350 to volatile memory 330 for execution/operation. In an embodiment, non-volatile memory 350 is a serial EEPROM, and both the instructions and data associated with the corresponding version of IP are copied (data may be created rather than copied) to volatile memory 330.

Volatile memory 330 and non-volatile memory 350 constitute computer program products or machine/computer readable medium, which are means for providing instructions to processing block 310. Processing block 310 may contain multiple processing units internally, with each processing unit potentially being designed for a specific task. Alternatively, processing block 310 may contain only a single general-purpose processing unit. The instructions executed by processing block 310 enable end device 110A to perform the steps of the flowchart of FIG. 3.

FIG. 4 is a diagram showing example components (hardware plus software) that reside in (or represent) end device 110A, in an embodiment. Hardware 470 represents physical components (e.g., processing block 310, volatile memory 330, etc) of end device 110A. Device driver 460 represents one or more sets of instructions used for controlling corresponding portions or components of hardware 470. IPv6 430 represents the network layer protocol according to IPv6, and is deemed to include all components of ICMPv6 as well. IPv4 450 represents the network layer protocol according to IPv4. TCP 420 represents the transmission control layer protocol for reliable data transfer. UDP 420 represents the User Datagram Protocol. Applications 410 represents end-user or user-level applications that are executed by end device 110A to provide desired features.

In communicating with other end devices as noted above, if communication is to occur according to IPv6, then processing block 310 copies the instructions and/or data representing IPv6 430 to volatile memory 330, while the instructions and code representing IPv4 450 remain in non-volatile memory 350. However, if communication is to occur according to IPv4, then processing block 310 copies the instructions and/or data representing IPv4 450 to volatile memory 330, while the instructions and code representing IPv6 430 remain in non-volatile memory 350. Device driver 460, TCP 420, UDP 440 and applications 410 are common blocks irrespective of whether communication is according to IPv6 or IPv4.

When end device 300 is to represent an end device (e.g., wired end device 140 of FIG. 1) communicating via a wired path, antenna 395 and switch 390 may not be used. Transmit block 370 and receive block 380 would be replaced by corresponding transmit and receive blocks designed for wired communication, and be suitably coupled to a wired path (e.g., 145 of FIG. 1). In general (i.e., whether in the context of a wireless end device or a wired end device), circuit blocks such as transmit block 370 and receive block 380 may together be referred to as a communication block, which is appropriately connected to a transmission medium (wired or wireless).

5. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of reducing the size of volatile memory in an end device in networks, wherein said end device is designed to operate either with a first version of internet protocol or according to a second version of internet protocol, said method comprising:

monitoring a set of packets on a network to determine a version of internet protocol using which said network is operative; and loading in said volatile memory only those data and instructions required for operation of said end device according to said first version of internet protocol if said monitoring determines that said version is said first version, but loading in said volatile memory only those data and instructions required for operation of said end device according to said second version if said monitoring determines that said version is said second version, wherein said first version of internet protocol is IPv6, wherein a router broadcasts a router advertisement packet according to IPV6 at regular intervals to end devices in said network, said monitoring determining that said version of internet protocol is IPv6 upon receipt of said router advertisement packet according to IPv6, wherein said loading loads in said volatile memory only those data and instructions corresponding to IPv6 and ICMPv6 if said monitoring determines that said version is IPv6, wherein said second version of internet protocol is IPv4, wherein said loading loads in said volatile memory only those data and instructions corresponding to IPv4 components if said monitoring determines that said version is IPv4, wherein said method further comprises:

transmitting a router solicitation message according to IPv6 to said router prior to said monitoring, wherein said router is designed to transmit said router advertisement in response to receipt of said router solicitation message if said version of internet protocol is IPv6 wherein said monitoring comprises waiting for a time-out period after said transmitting, and determining that said version is IPv4 if no router advertisement packet is received in said time-out period.

2. A non-transitory machine readable medium storing one or more sequences of instructions in an end device of a network, wherein said end device is designed to operate either with a first version of internet protocol or according to a second version of internet protocol, wherein execution of said one or more sequences of instructions by one or more processors contained in said end device causes said end device to perform the actions of:

monitoring a set of packets on said network to determine a version of internet protocol using which said network is operative; and loading in said volatile memory only those data and instructions required for operation of said end device according to said first version of internet protocol in said network if said monitoring determines that said version is said first version, but loading in said volatile memory only those data and instructions required for operation of said end device according to said second version in said network if said monitoring determines that said version is said second version, wherein said first version of internet protocol is IPv6, wherein a router broadcasts a router advertisement packet according to IPV6 at regular intervals to end devices in said network, said monitoring determining that said version of internet protocol is IPv6 upon receipt of said router advertisement packet according to IPv6, wherein said loading loads in said volatile memory only those data and instructions corresponding to IPv6 and ICMPv6 if said monitoring determines that said version is IPv6, wherein said second version of internet protocol is IPv4, wherein said loading loads in said volatile memory only those data and instructions corresponding to IPv4 components if said monitoring determines that said version is IPv4, wherein said non-transitory machine readable medium further comprises instructions for:

transmitting a router solicitation message according to IPv6 to said router prior to said monitoring, wherein said router is designed to transmit said router advertisement in response to receipt of said router solicitation message if said version of internet protocol is IPv6 wherein said monitoring comprises waiting for a time-out period after said transmitting, and determining that said version is IPv4 if no router advertisement packet is received in said time-out period.

3. An end device in a network, wherein said end device is designed to operate either with a first version of internet protocol or according to a second version of internet protocol, said end device comprising:

a processor;

a communication block;

a non-volatile memory; and a volatile memory, wherein said processor is operable to:

load, from said non-volatile memory, into said volatile memory, data and instructions required for operation of said end device according to said first version of internet protocol in said network;

monitor a set of packets on said network to determine a version of internet protocol using which said network is operative, wherein said end device is operational according to said first version while monitoring of said set of packets; and if said version is determined to be said second version, then to remove, from said volatile memory data and instructions required for operation of said end device according to said first version, and to load, from said non-volatile memory into said volatile memory, data and instructions required for operation of said end device according to said second version of internet protocol in said network, wherein said first version of internet protocol is IPv6, wherein a router broadcasts a router advertisement packet according to IPV6 at regular intervals to end devices in said network, said processor determining that said version of internet protocol is IPv6 upon receipt of said router advertisement packet according to IPv6, wherein said processor loads in said volatile memory only those data and instructions corresponding to IPv6 and ICMPv6 if said version is determined to be IPv6, wherein said second version of internet protocol is IPv4, wherein said processor loads in said volatile memory only those data and instructions corresponding to IPv4 components if said version is determined to be IPv4, wherein said processor is further operable to transmit a router solicitation message according to IPv6 to said router prior to monitoring said set of packets, wherein said router is designed to transmit said router advertisement in response to receipt of said router solicitation message if said version of internet protocol is IPv6, wherein said processor is operable to wait for a time-out period after transmitting said router solicitation message according to IPv6, said processor determining that said version is IPv4 if no router advertisement packet is received in said time-out period.

* * * * *